Feb. 29, 1944.    J. D. MORGAN ET AL    2,343,154
GREASE DISPENSING APPARATUS
Original Filed July 18, 1939
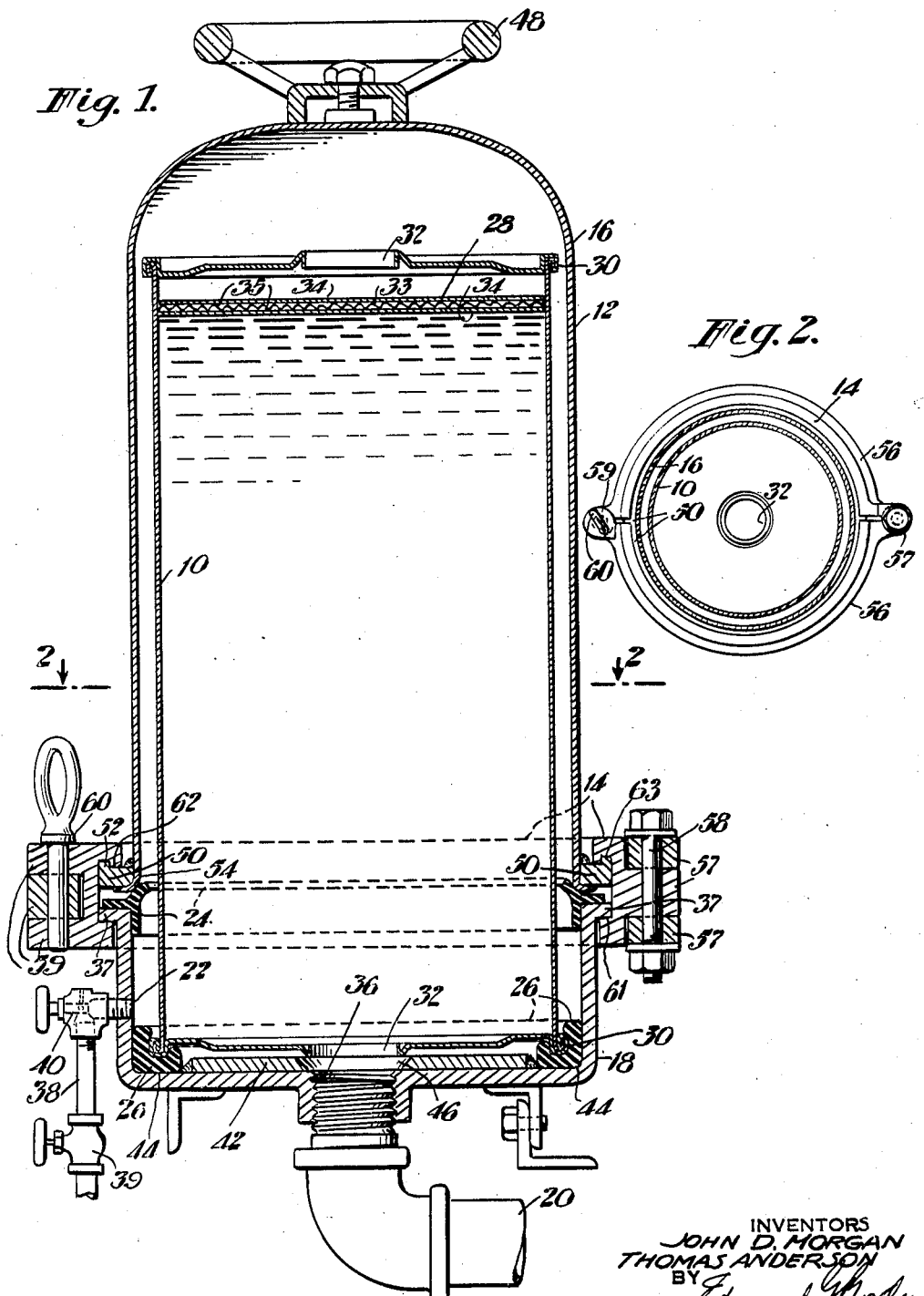
INVENTORS
JOHN D. MORGAN
THOMAS ANDERSON
BY
*Edmund T. Borden*
ATTORNEY Patented Feb. 29, 1944

2,343,154

UNITED STATES PATENT OFFICE 2,343,154

GREASE DISPENSING APPARATUS

John D. Morgan, South Orange, and Thomas Anderson, Elizabeth, N. J., assignors, by mesne assignments, to Cities Service Oil Company, New York, N. Y., a corporation of Pennsylvania Original application July 18, 1939, Serial No. 285,070, now Patent No. 2,296,047, dated September 15, 1942. Divided and this application September 12, 1941, Serial No. 410,518

2 Claims. (Cl. 206—56)

This invention relates to grease dispensing apparatus, and more particularly to an improved grease can or container adapted for service with portable grease dispensing apparatus of the type in which the can is inserted within a pressure chamber and unloaded directly to a grease gun by application of compressed air pressure. The grease dispensing apparatus which forms the subject of this invention was originally described in our copending application Serial No. 285,070, filed July 18, 1939, of which this is a division.

A primary object of the present invention is to provide an original container or can for grease of comparatively simple and inexpensive design adapted for direct unloading to a grease gun by means of air pressure operated dispensing apparatus.

The original grease can element of the apparatus comprises essentially a cylindrical container having sealed end closures with apertures therein which are closed during shipment by friction plugs. Only one end of the can is mounted and sealed prior to filling the can with grease, and a follower piston of stiff and light weight construction is inserted within the can on top of the sealed bottom closure before introducing the charge of grease. After the can has been filled with grease, the other end closure is applied and sealed.

Apparatus of the type heretofore designed for dispensing or feeding grease from a can equipped with a follower piston has given trouble because of deformations which often develop in the light metal walls of the grease can and which interfere with free movement of the piston. The construction of the pistons heretofore generally used has also been a serious source of difficulty because of the tendency of such pistons to bury themselves in the underlying grease on application of air pressure, and because the pistons heretofore used have in general been inefficient in performance of their principal function of displacing grease without bypassing grease and air. It will be appreciated that any grease bypassed by the piston represents an incomplete and inefficient removal of grease from the can, and that any air bypassed by the piston or by the grease can is apt to air-bind the grease pump to which the grease is being fed.

Other objects of the present invention are therefore to provide an improved original grease can and grease dispensing apparatus for unloading the same, in which the aforementioned defects are largely overcome; and to provide apparatus which is simple and efficient in operation.

Among the novel features of the present invention are the provision of a piston for the grease container which is so designed as to insure its functioning properly without substantial distortion or bypassing of air or grease, despite the presence of slight deformations in the walls of the grease cartridge; and the provision of a suitable gasket sealing element between the grease unloading end of the can and the base of the air pressure chamber, whereby to insure air pressure unloading of the cartridge without bypassing air to air-bind the grease pump.

With the above and other objects and features in view, the invention consists in the improved grease dispensing apparatus which is hereinafter described and more particularly defined by the accompanying claims.

In the drawing, Fig. 1 is a view in vertical section showing the principal elements of the apparatus in assembled relation after application of air pressure preparatory to the dispensing of grease from the original can; and Fig. 2 is a cross-sectional view in reduced scale, taken on the line 2—2 of Fig. 1.

Referring to the drawing, and particularly to Fig. 1, the principal elements of the apparatus comprise a cylindrical sheet metal or cardboard can or cartridge grease container 10; a cylindrical two-sectioned pressure chamber 12 dimensioned to accommodate therein the can 10 with sufficient clearance for easy insertion and removal; a coupling ring 14 by means of which a bell lid 16 and a dished base 18, which together make up the sectional chamber 12, may be coupled together; a grease outlet pipe 20 leading out centrally from the base of chamber 12 to a grease gun (not shown); an inlet port 22 for introducing compressed air into chamber 12; annular gaskets 24 and 26 for sealing the chamber 12 against escape of air therefrom; and a piston 28 slidably mounted in can 10 for the purpose of displacing grease from the can through outlet pipe 20.

Can 10 may be constructed of light sheet metal (24 gauge) with straight cylindrical sides joined to the ends (preferably recessed for stiffness) by outwardly rolled reinforcing ring joints 30. Both ends of the can 10 are preferably provided with central apertures 32 which are designed to accommodate friction plug closures (not shown). In Fig. 1 the apparatus is shown with the base 18, the bell 16, and the coupling ring 14 and gaskets in the positions which they assume after sufficient air pressure has been built up in chamber 12 to raise the bell off its seat on the base.

Piston 28 is dimensioned to form a close sliding fit within can 10. For example, with a can of 9¼" inside diameter, the piston may have a diameter 3/32" less than that of the can. The piston is normally a disk of about ⅛" thickness, and according to the present invention should be constructed of mechanically strong material which is somewhat flexible and which has a specific gravity not substantially greater than one-half that of the grease which is being handled. A preferred material for the construction of the piston is a corrugated paper sold under the trade name "Kraftex" (constructed of an inner corrugated layer 33 and two outside flat sheets 34 bonded together with silicate of soda). The faces of the piston are preferably coated with oil resistant wax or varnish. Such a corrugated paper piston has a specific gravity of only about ⅓ that of the grease, together with a bursting strength of 200 lbs. per square inch, and sufficient flexibility so that its edges will yield to pass any deformation normally produced in the wall of the can 10 during shipment, while still retaining sufficient rigidity to perform its main grease displacing function without permitting substantial by-passing of air. Because of its light weight and the air pockets 35 characteristic of its construction, the piston will float on top of the grease body while it is forcing the grease from the can under applied air pressure.

The base section 18 of the pressure chamber 12 is shown as a cylindrical dish-shaped vessel having in the center of its base a tapped aperture 36 with which grease discharge pipe 20 threadably engages. The top rim of the base 18 is provided with an annular squared outwardly projecting flange 37. An air supply pipe 38, equipped with an air supply valve 39 and an air release valve 40, threadedly engages air inlet orifice 22 in base 18. The interior of the base 18 is preferably built up by means of an annular plate 42 to form an annular pocket 44 within which gasket 26 is mounted, and to form an axial conical seat 46 for the edges of the bottom aperture 32 of can 10 during the period when air pressure is applied to the apparatus. Gasket 26 (preferably constructed of rubber or of other flexible oil resistant material) functions as a centering seat for the bottom rim 30 of can 10, and as a seal against escape of air from chamber 12 past the bottom of the can 10 into grease discharge pipe 20. The gasket 26 is preferably so shaped and dimensioned that it will seat and seal cans 10 of varying dimensions, as for example, cans ranging in diameter from 8½" to 9½".

The bell lid 16 of chamber 12 preferably has an inside diameter somewhat smaller than that of base 18. The bell may be of ⅛" thickness drawn steel, designed to carry a maximum working air pressure of 300 lbs. per square inch. Bell 16 is shown as provided at its top with a hand grip 48, and is fitted at its rim with an annular external flange 50 having at its outer rim an upwardly projecting annular locking ring 52. The bottom of flange 50 is designed to seat on the top of flange 37 of the base member, and the top of flange 50 cooperates with the bottom of flange 37 and with coupling ring 14 to form a safety lock coupling for the section 16 and 18, preventing dismantling of the apparatus prior to the release of air pressure from chamber 12.

Gasket 24 has been illustrated as an annular ring gasket of substantially Y-shaped cross-section. The inside edge or rim of the flange 50 has also been illustrated as tapering outwardly at a substantially 45° angle in the circumferential plane 54 where the bottom rim of shell 16 engages the stem section of the Y-sectioned gasket 24. One arm of the gasket 24 rests on the top surface of flange 37, and the other arm of the gasket hugs the inside top rim of base 18. Thus the gasket 24 forms a soft seat for bell 16 on base 18 when there is no air pressure within chamber 12, and when bell 16 is raised off its seat by application of compressed air within chamber 12 (Fig. 1), the stem and downwardly extending arm of gasket 26 are forced into tight sealing relation respectively with the portion 54 of the bottom rim of bell 16 and the inner wall of base 18, to prevent escape of air past the joint.

As shown best in Fig. 2, coupling ring 14 consists of two semicircular ring sections 56 (preferably of forged steel) which are permanently hinged together at one end by matching lugs 57 and a common hinge bolt 58, and which may be rapidly brought together and pinned at the swing ends by matching lugs 59 and a locking pin 60. Each section 56 of the coupling ring 14 is substantially C-shaped in cross-section, with that portion 61 of its concave inner surface which overhangs the bottom edge of flange 37 squared to match the flange, and with the top section of its inner surface which overhangs ring 52 having a depressed rim 62 forming an annular groove 63 which is shaped and dimensioned to match and lock with the top of ring 52 of flange 50 when the bell 16 is raised off its seat by air pressure applied to the chamber 12. With this construction, therefore, it is impossible to disconnect the coupling ring sections 14 from the flanges 37 and 50 as long as there is sufficient air pressure in chamber 12 to lift the bell 16 from its seat on flange 37. At the same time the upwardly extending ring 52 of flange 50 is of less height than the width of the space separating the bottom of the flange 50 from the horizontal arm of gasket 24 with the bell in its raised coupled position. Consequently, when there is no air pressure within the chamber 12, coupling 14 can be quickly swung into or out of coupling position with relation to flanges 50 and 37, with or without the use of pin 58 to hold the coupling ring sections in coupling position during the period when the bell 16 is seated on the top of flange 37. The coupling joint is preferably constructed so that the bell 16 is lifted about ⅛" off its seat during application of air pressure to bring it into locking position with respect to the coupling ring sections 14.

The can 10 may be filled with grease while in upside down position to that shown in Fig. 1, with the top friction plug closure in place and with the bottom plug removed, and the piston 28 inside of the can, so that when grease is introduced the piston will lie at the bottom of the can in the grease filling position. After filling the can the top cover of the can is fitted thereto by the grease manufacturer preparatory to shipment. When the can is received by the operator of the grease dispenser, the first step is to remove the friction plugs from both end apertures 32, and to place the can in the air chamber 12, with that end of the can at which the piston 28 is located at the top of the chamber and with the bottom rim of the can seated on the gasket 26. The sections 18 and 16 of the air chamber are then assembled and the coupling ring 14 swung into place. Air pressure is then turned on to build up a pressure of about 300 lbs. within the chamber. The compressed air surrounds the can 10 and therefore bears downwardly against the piston 28, so that any pressure tending to collapse the walls of the can is counterbalanced by the air pressure applied to the grease within the can. An unbalanced air pressure equal to the area of the friction plug removed from the aperture 32 at the base of the can serves to hold the can against its seat on the gasket 26 and to force the grease out of the can through the pipe 20. It will be noted that the coupling ring 14 and the flanges 37 and 50 are so designed that no circumferential stress is placed on the coupling ring during application of air pressure within the chamber 12. The apparatus will operate over a considerable range of pressures, say for example pressures of 75–300 lbs. per square inch.

Having thus described the invention, what is claimed as new is:

1. A grease marketing and dispensing container comprising a cylindrical container with sealed end closures, one closure having a centrally arranged opening which is normally closed by a cap, said opening being adapted to register with a grease outlet of a dispensing pump, the other end closure having an opening normally closed by a cap, which cap is removable for the purpose of admitting compressed air into the container and a follower piston of substantial rigidity slidably sealed within and closely fitting the inner cylindrical wall of the container and arranged for forcing grease from the container toward the discharge opening under air pressure upon the piston, said piston having a specific gravity not substantially exceeding one half of the specific gravity of the grease to be dispensed and normally positioned adjacent the air inlet closure when the container is filled with grease.

2. The grease dispensing container defined in claim 1 in which the piston is constructed of superposed layers of paper some of which are corrugated to add mechanical strength to the piston and to provide air pockets within the piston for reducing its specific gravity.

JOHN D. MORGAN.
THOMAS ANDERSON.